Patented May 16, 1933

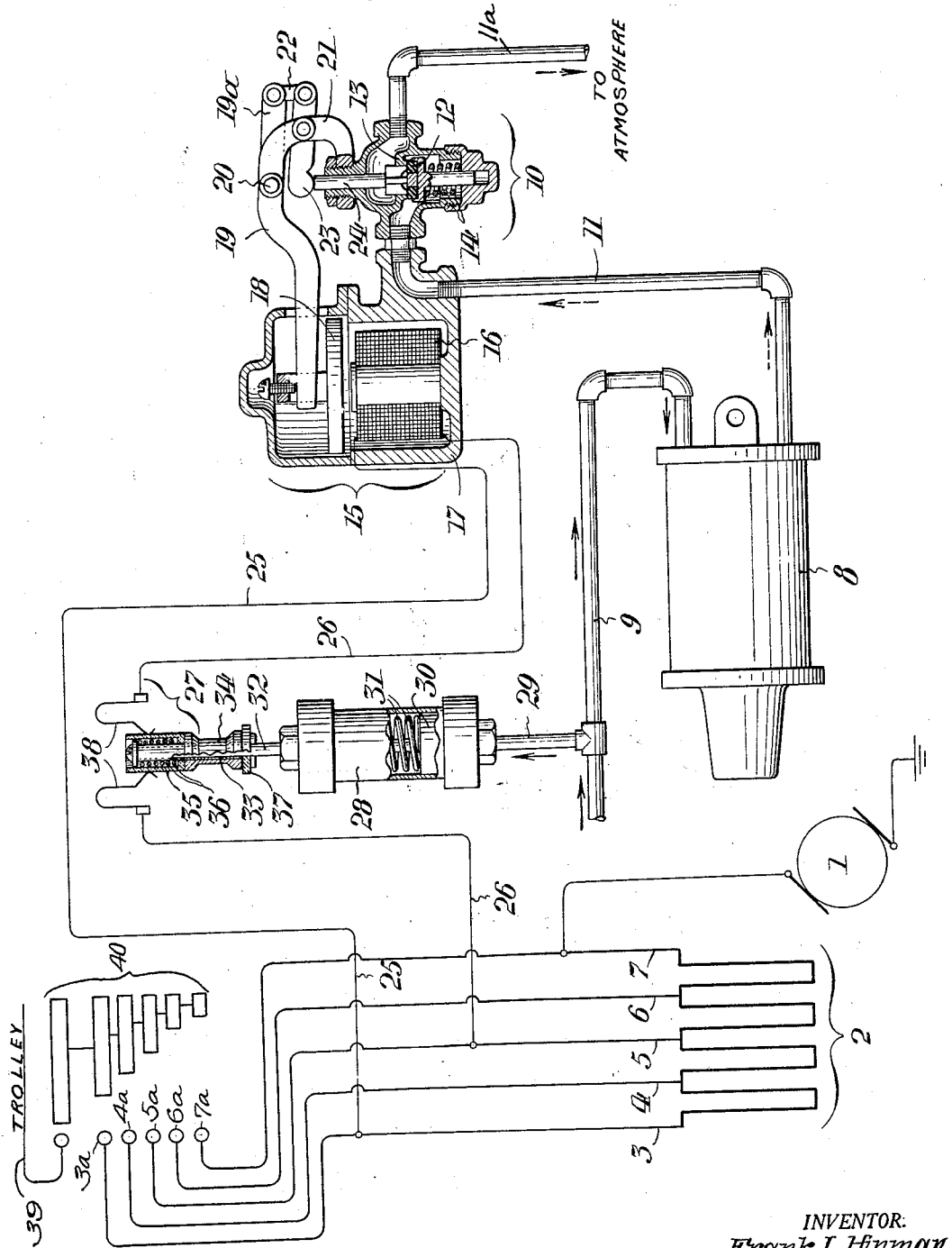

1,909,403

UNITED STATES PATENT OFFICE

FRANK L. HINMAN, OF PHILADELPHIA, PENNSYLVANIA

AIR BRAKE SYSTEM

Application filed February 2, 1931. Serial No. 512,848.

This invention relates to air brake systems of a type adapted for use more especially in connection with trolley cars or similar vehicles driven by electric motors.

In the main, my invention is directed toward provision, in connection with an air brake system for electrically driven vehicles, of means automatically operative upon starting of the motors after either a service or emergency stop, to instantaneously exhaust the air from the system so that the brakes are immediately released. Jarring and attendant discomfort to the passengers of such vehicles due to delayed brake release at starting as heretofore, is thus entirely precluded, and a much faster getaway made possible through my invention with a minimum consumption of power.

The foregoing desideratum I attain through the use of an auxiliary exhaust valve at the actuating cylinder for the brakes, and through provisions whereby the said exhaust valve is electrically actuated automatically as current is supplied to the motors of the vehicle at starting. With such an arrangement, I obviate travel of the air first in one direction and then in the other through the piping connections of the system (as was ordinarily the case in braking systems heretofore) incident to application and release of the brakes, to the advantage that trapping of moisture and freezing of the system is effectively precluded in winter weather.

Further objects and attendant advantages of my invention will be manifest from the following detailed description of the attached drawing which shows, more or less diagrammatically, a brake system for a motor driven vehicle conveniently embodying my invention.

With more detailed reference to the drawing the numeral 1 designates one of the motors of the vehicle, which receives current at starting through a resistor conventionally represented at 2, the latter having taps 3, 4, 5, 6 and 7. The brake system constituting the present invention includes a brake cylinder 8 which, under the control of the operator's valve, not shown, receives compressed air from a suitable storage tank through a pipe line 9. With the brake cylinder 8 is associated an auxiliary exhaust valve 10 which is in communication with said cylinder through a pipe connection 11, and which exhausts to the atmosphere by way of another connecting pipe 11a. The movable member 12 of the auxiliary relief valve 10 is normally held against its seat 13 by means of a compression spring 14. To actuate the auxiliary exhaust valve 10, I provide a means 15 consisting of an electromagnet 16 which is enclosed in a casing 17 and is effective upon a movable armature 18. This armature 18 imparts motion to a lever 19 fulcrumed at 20 on a curved bracket 21 clamped to the casing of the valve 10. As shown, the shorter extremity 19a of the lever 19 is coupled, by means of a link 22, with a finger 23 which also has fulcrum bearing on the clamp bracket 21 and whereof the free end rests against the exposed end of the stem 24 of the valve 10. The magnet coil 16 of the valve actuating means 15 is in circuit with the taps 3 and 5 of the motor resistor 2 through conductors 25 and 26. Interposed in the conductor 26 is an electric switch 27 adapted to be actuated by an air cylinder 28 which is in communication through a branch pipe 29 at the bottom, with the pipe 9 that leads to the main brake cylinder 8. The piston 30 of the switch actuating cylinder 28 is subject to a compression spring 31, and thereby normally held in its lowered or retracted position. The rod 32 of the piston 30 extends to the exterior where it is covered with a sheath 33, of insulation, and where it affords sliding guidance for a spool-shaped metallic sleeve 34, as well as for a superposed di-electric sleeve 35. A spring 36 within the hollow of the di-electric or insulate sleeve 35 functions to yieldingly urge the spool-shaped metallic sleeve 34 against a stop collar 37 on the piston rod 32, said collar being also of insulation so that the metallic sleeve 34 is electrically isolated relative to the rod 32. The insulate sleeve 35 normally occupies the position illustrated between the spring contacts 38 of the switch 27; but upon projection of the piston rod 32 when compressed air is permitted to enter the cylinder 28, its place is taken by the spool-shaped metallic sleeve 34 with attendant bridging of the switch contacts 38. When the cylinder 28 is subsequently exhausted, the spool shaped sleeve 34 is detained by the switch contacts 38 as the piston 30 descends with attendant compression of the spring 36 which ultimately exerts its force to dislodge the metallic sleeve 34 and so instantly interrupts the circuit through the switch 27 to the avoidance of any arcing. Any other suitable quick circuit breaking means may be employed if desired in lieu of the arrangement just described. At 39, I have conventionally indicated the trolley of the car; and at 40 the motor controller whereof the contacts 3a, 4a, 5a, 6a, and 7a are connected to the resistor 2 by means of the conductors 3, 4, 5, 6 and 7 hereinbefore referred to.

The operation of the system is as follows:
Upon approaching a stop, the operator shuts off the power to the motor 1, and, by means of his brake valve, permits flow of compressed air to the brake cylinder 8 through the pipe 9. Compressed air is at the same time admitted to the cylinder 28, causing the piston rod 32 of the latter to move upward with incidental bridging of the switch contacts 38 by the metallic spool-shaped sleeve 34. Since no current is flowing in the conductors 25, 26 at this time, the exhaust valve 10 is held closed by the pressure of its spring 14. Obviously the above condition will obtain as long as the brakes are applied. When the vehicle is started, electric current enters the resistor 2 by way of the first tap 3 and leaves by way of the last tap 7 enroute to the motor 1. The difference of potential established, as a result, between the taps 3 and 5 to which the conductors 25, 26 are connected, is such that sufficient current is supplied for the energization of the electromagnetic means 15 to actuate the auxiliary exhaust valve 10. The pressure in the cylinder 8 is thereby permitted to escape to the atmosphere by way of the pipe 11a, and the brakes are accordingly released instantly to permit the vehicle to move forward immediately. A quick get-away is thus made possible under a minimum pull of power and with absolute freedom from jarring and discomfort to the passengers in the vehicle. In this connection it is important to note that the flow of the air through the piping of the sytem is always in one direction, as indicated by the arrows in the illustration, to the end that all entrained moisture is expelled with the air and freezing thereby precluded in winter weather. As the handle (not shown) of the controller is advanced by the operator to increase the speed of the vehicle, the flow of current to the electro-magnetic means 15 is gradually diminished and eventually interrupted altogether whereupon the auxiliary exhaust valve 10 is closed automatically by its spring 14. Should the controller handle be held too long a time on the first or second point, the piston 30 in the cylinder 28 will be forced down by the spring 31 to effect opening of the switch contacts 38, in the manner previously explained, as the pressure in the system falls by reason of air leakage.

In order to permit the operation of electrically actuated track switches which require the application of power to the motor circuit while the brakes are applied, the spring 31 is so designed that a predetermined air pressure may build up in the brake cylinder 8 without causing closure of the switch contacts 38. The auxiliary exhaust valve 10 is thereby prevented from opening while the track switch is being operated.

From the foregoing it will be seen that I have provided a very simple yet reliable air brake mechanism for electrically propelled vehicles, whereby the inherent drawbacks of pre-existent systems for the same purpose are effectively overcome.

Having thus described my invention, I claim:

1. In a vehicle driven by an electric motor, air brake means including a brake cylinder; a normally closed auxiliary exhaust valve associated with the said cylinder; and electric means operative upon starting of the motor to automatically open the valve aforesaid to exhaust the cylinder for release of the brakes.

2. In a vehicle driven by an electric motor, air brake means including a brake cylinder; a normally closed auxiliary exhaust valve associated with the cylinder; and electric means for actuating the valve; and means automatically operative incident to starting of the motor to supply current to the electric means aforesaid to open the valve and thereby effect release of the brakes.

3. In a vehicle driven by an electric motor, air brake means including a brake cylinder; an auxiliary exhaust valve associated with the cylinder; electric means for actuating the valve; means automatically operative incident to starting of the motor to supply current to the electric means aforesaid to open the exhaust valve and thereby effect release of the brakes; a switch in circuit with the electric means aforesaid; and means for automatically opening the said switch upon release of the brakes as aforesaid.

4. In a vehicle driven by an electric motor, air brake means including a brake cylinder; an auxiliary exhaust valve associated with the cylinder; electric means for actuating the valve; means operative incident to starting of the motor to supply current to the electric means aforesaid to open the valve and thereby effect release of the brakes; a switch in circuit with the electric valve actuating means; a pneumatic cylinder connected in the air line with the brake cylinder, for closing the switch incident to brake application; and spring means for automatically opening the said switch upon decrease of pressure within the switch actuating cylinder when the auxiliary exhaust valve is opened as aforesaid.

5. In a vehicle driven by an electric motor, a resistor for interposition in the motor circuit during starting; and air brake means including a brake cylinder, a normally closed auxiliary exhaust valve associated with the brake cylinder, and electric means receiving current from the resistor to open the auxiliary exhaust valve incident to starting of the motor for immediate release of the brakes.

6. In a vehicle driven by an electric motor, brake means including an actuator, a normally closed control for said actuator, and electric means operative upon starting of the motor to automatically open the control and release the actuator for immediate withdrawal of the brakes.

In testimony whereof, I have hereunto signed my name at Philadelphia, Pennsylvania, this 28th day of January, 1931.

FRANK L. HINMAN.